United States Patent [19]

Scheuerle et al.

[11] 3,943,002
[45] Mar. 9, 1976

[54] DEVICE FOR DRYING NEGATIVE PLATES AND PLATES MADE THEREWITH

[75] Inventors: Robert F. Scheuerle, Philadelphia; John F. Vinkler, Hatoboro, both of Pa.

[73] Assignee: ESB Incorporated, Philadelphia, Pa.

[22] Filed: Feb. 25, 1975

[21] Appl. No.: 552,949

[52] U.S. Cl. ............................ 136/33; 34/13; 34/36
[51] Int. Cl.² ..................... H01M 35/30; F26B 3/00
[58] Field of Search ............. 136/33, 27, 78; 34/13, 34/20, 36, 37, 27, 17

[56] References Cited
UNITED STATES PATENTS

| | | | |
|---|---|---|---|
| 1,688,399 | 10/1928 | Reinhardt | 136/33 X |
| 3,227,584 | 1/1966 | Arnold | 136/33 |
| 3,328,893 | 7/1967 | Schilling | 34/27 |
| 3,838,526 | 10/1974 | McAlpine | 34/17 |

Primary Examiner—Anthony Skapars
Attorney, Agent, or Firm—Wm. Wharton Smith; Robert H. Robinson; Anthony J. Rossi

[57] ABSTRACT

Wet formed negative storage battery plates are dried without oxidation by a drying cycle including a first portion where dry steam is circulated about the plates, and a second portion where the plates are further dried and cooled in carbon dioxide containing atmosphere until they will not oxidize when exposed to air. An apparatus for carrying out this drying cycle is also described.

6 Claims, 4 Drawing Figures

DEVICE FOR DRYING NEGATIVE PLATES AND PLATES MADE THEREWITH

BACKGROUND OF THE INVENTION

1. Field of the Invention

This invention relates to the manufacture of galvanic cells. In particular, it relates to the manufacture of negative lead acid plates and a process for drying such plates.

2. Description of the Prior Art

It has long been known that a wet electrochemically formed negative plate for a lead acid storage cell will oxidize when exposed to air. A battery built of such plates must be charged before it will deliver an electric current. If the negative plate is dried in such a way that it is not oxidized, a dry battery can be built which will deliver electric currents as soon as it is filled with electrolyte This has been found to be desirable in the storage battery market place.

The active material of a formed negative plate is lead sponge. It has a very large surface and is very active chemically. When a wet plate is dried in an atmosphere of air, it passes through a stage where some although not all the water has been removed from its pores. When the moisture content is at a critical value, some of the lead sponge becomes very reactive toward atmospheric air. The reaction produces heat, drying other parts of the sponge into the reactive state. This starts a chain reaction which continues until the entire mass of sponge has reacted and has been changed from metallic lead sponge to lead oxide. The heat evolution is considerable. Piles of plates will often get hot enough to melt — which of course completely destroys them. If plates are dried without passing through the critical point of moisture, oxygen and temperature build up, they can be completely dried without the run-away oxidation. The lead sponge, when fully dry, is not very reactive to air at room temperature so that when once dried they can be stored for long periods of time.

During the drying period, the plates are unreactive to such gasses as steam, nitrogen and carbon dioxide (although at high temperatures somewhat above 350°F. (177°C.) the lead sponge may react with carbon dioxide in the presence of moisture to form lead carbonate). It is also unreactive to the inert gasses of the zero group of the periodic table as well as countless organic vapors. Because of exposure, it is desirable to use the least costly of the gasses noted above for drying battery plates. The several gasses suggested above and including steam, nitrogen and carbon dioxide can be considered to be inert to lead sponge during a drying cycle.

Many processes have been tried and used for drying negative plates free from or with only slight oxidation. Among such processes have been vacuum drying, drying in hot oil, drying between hot plattens, drying in steam and drying in inert atmospheres and numerous other methods have been demonstrated. It is possible to dry plates by exposure to a blast of dry air with only moderate oxidation (10% or so). The very best processing such as vacuum drying has given plates having ½% or less oxide. In general, an oxide content between 5 and 10% is satisfactory for many battery types. Storage battery plates dried between hot plattens have been cooled by being inserted in a box containing dry ice (solid carbon dioxide). This treatment cools the plates very rapidly and at the same time protects them from oxygen.

SUMMARY OF THE INVENTION

A process for drying wet formed negative storage battery plates includes a first drying step in an atmosphere that is essentially circulating dry steam. A second drying step following the first is continued drying in an atmosphere of mixed steam and inert gas. This is followed by a third step of cooling in the inert gas without the presence of steam. The temperatures of the drying steps may be held constant or it may start at a first high temperature and end at a second high temperature lower than the first.

The dry steam is provided by adding heat to atmospheric steam. Inert atmospheres suitable for cooling include carbon dioxide and nitrogen. It has been found very desirable to keep the heat supply on during the change from the hot drying atmosphere to the inert cooling atmosphere. A typical heating cycle starts at a temperature of about 350°F. (177°C.) and drops to about 290°F. (156°C.) as the plates approach dryness. Cooling is usually done at a temperature below 150°F. (65°C.).

A device for implementing this process comprises a gas tight chamber with a close fitting door. The chamber is equipped with devices for circulating the atmosphere in the chamber, heating the atmosphere and cooling the atmosphere. A connection is provided to the interior for introducing steam therein and a connection is provided to the interior for introducing an inert gas other than steam. A control unit provides complete automatic control of the heating and cooling cycles. An outlet is provided to prevent excessive pressure within the chamber.

The dry steam of the present process is actually superheated steam at atmospheric pressure. Its temperature is in the range of 250 to 350°F. and hence it is a powerful drying agent. Further, the steam is recirculated over the heating device so that its capacity for drying is maintained. However, when the battery plates forming the load are dry, they must be cooled prior to exposure to air for when dry and at a temperature over 250°F. they tend to oxidize rapidly. When steam is cooled below 212° at atmospheric pressure, it becomes saturated and therefore is unsuitable for a drying and cooling medium. Therefore, the cooling cycle is conducted in an inert atmosphere other than steam. The two most readily avilable drying media are carbon dioxide and nitrogen, either of which is a suitable atmosphere for the present invention.

DESCRIPTION OF THE PREFERRED EMBODIMENT

Figure 1:
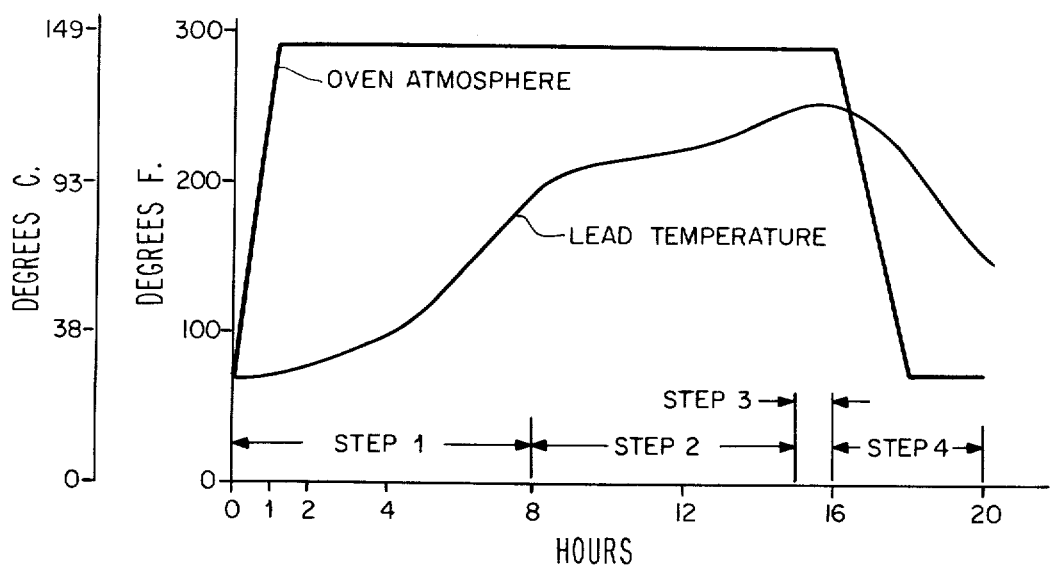
FIG. 1 depicts in graph form the process of the present invention.

The chart of FIG. 1 depicts a typical drying cycle of the present invention. This chart depicts certain temperature changes of the load and atmosphere as the oven is taken through a series of process steps in a timed sequence as follows:

Prior to the start of the drying schedule the oven is loaded with formed, washed, wet negative storage battery plates. The plates may be piled one on top of another and in several piles on one or more pallets to make a suitable load. The load may run from 2 to 4 tons of wet plates. When the oven is loaded, the doors are closed and the circulating fan is started.

Step 1. Turn on steam supply and heat supply with temperature control set to a temperature above 250°F. (121°C.).

Step 2. Prior to the completion of the drying cycle and as early as the end of the first quarter of the drying cycle (4 hours) start admission of the inert drying gas.

Step 3. When plates are dry, stop admission of steam leaving both the heat supply and the inert gas supply on.

Step 4. Within 10 to 20 minutes after step 3, turn off the heat supply and turn on the cooling device. Continue cooling until the plates are below 150°F. (65°C.).

This completes the drying cycle. The inert gas supply is turned off, the cooling device is turned off, the doors are opened and the load may be removed.

In a typical cycle using a load of 4 tons of plates, the time for the several steps is approximately:
Step 1: 4 hours temp. of atmosphere = 330°F. (166°C.)
Step 2: 9¾ hrs. temp. of atmosphere = 330°F.
Step 3: ¼ hrs. temp. of atmosphere = 330°F.
Step 4: 2 hours temp. of atmosphere = below 150°F. (65°C.)
Total cycle 16 hours The time at which all the plates are dry can be determined by the temperature of the plates. As long as any appreciable moisture remains in the plate, its temperature will remain near 212°F. (100°C.). Thermocouples placed in strategic points in one or more of the plate piles thus can be used for the determination of the end of the cycle. Also, due to the particular design of the oven of the invention, once the time points have been determined for a particular load they can be used for further drying cycles without further need to monitor the load temperatures.

In a second embodiment of the invention, the temperature of the oven atmosphere is raised to a first high temperature and then is slowly but continually reduced to a second high temperature lower than the first. In this embodiment, we find:

Step 1a. Turn on steam supply and turn of heat to a first high value, for example 350°F. (177°C.)

Step 1b. Over an extended time period, gradually reduce the temperature to a second high temperature lower than the first for example 290°F. (144°C.), the extended time period being sufficient to enable all plates to reach dryness.

Step 2a. At a chosen point in the drying cycle for example at 4 hours after the start of step 1, open admission valve for carbon dioxide, continuing drying cycle with both steam and carbon dioxide present.

Steps 3a and 4a are the same as steps 3 and 4. The second embodiment is preferred over the first embodiment as it permits drying in a minimum time with minimum exposure of the dry plates to the hot glasses.

In a third embodiment, the first high temperature of Step 1a is maintained for a time period such as 4–8 hours at which time the second high temperature, lower than the first is inaugurated and held till the end of the drying cycle. The third embodiment requires a somewhat less complicated control device than the second embodiment.

There are several critical aspects to the operational sequences described above. These include:

a. The tightness of the drying chamber. although it is very difficult to build and maintain a truly tight box, the oven must be tight enough so that a modest positive pressure can be maintained during both heating and cooling steps;

b. maximum gas temperature. This must be below a temperature at which there is appreciable deterioration of the plate either from the formation of lead carbonate or the removal of the organic materials added to many negative battery plates;

c. The addition of carbon dioxide prior to the shutting off of steam. This sequence has an appreciable effect on the production of a low oxygen pick up by the plates. It is associated with the tightness of the box and becomes increasingly important with the leakyness of the oven:

d. the interval between shutting off steam and the start of the cooling cycle. The remarks of c above apply equally to this delay period;

e. ending the cycle when plates are cooled to 150°F. (b 65°C.). If plates are taken out much hotter than this temperature, they may oxidize. Cooling beyond this temperature adds cost and time to the cycle.

Figure 2:
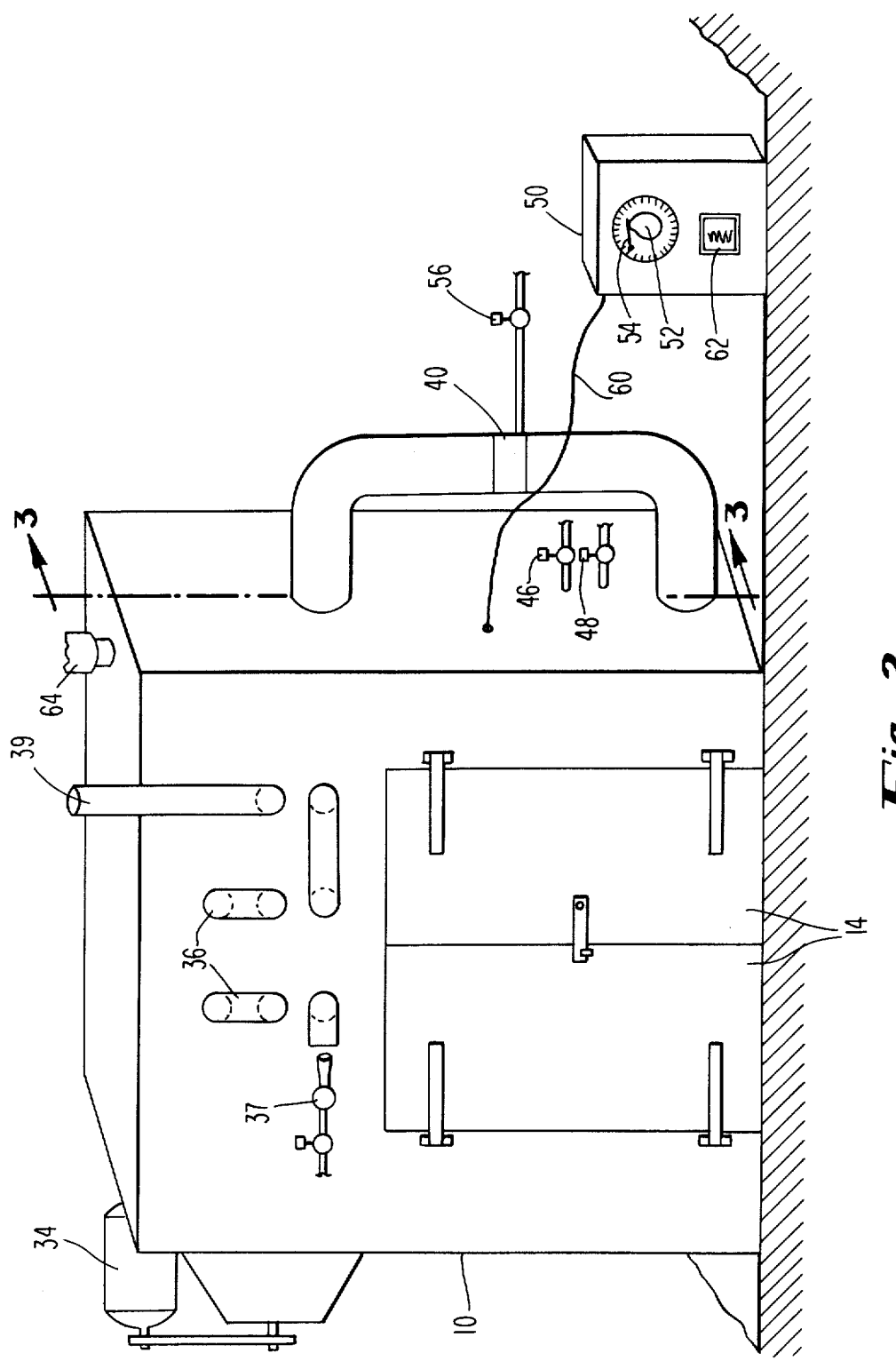
FIG. 2 represents in perspective an oven suitable for the implementation of the process.
Figure 3:
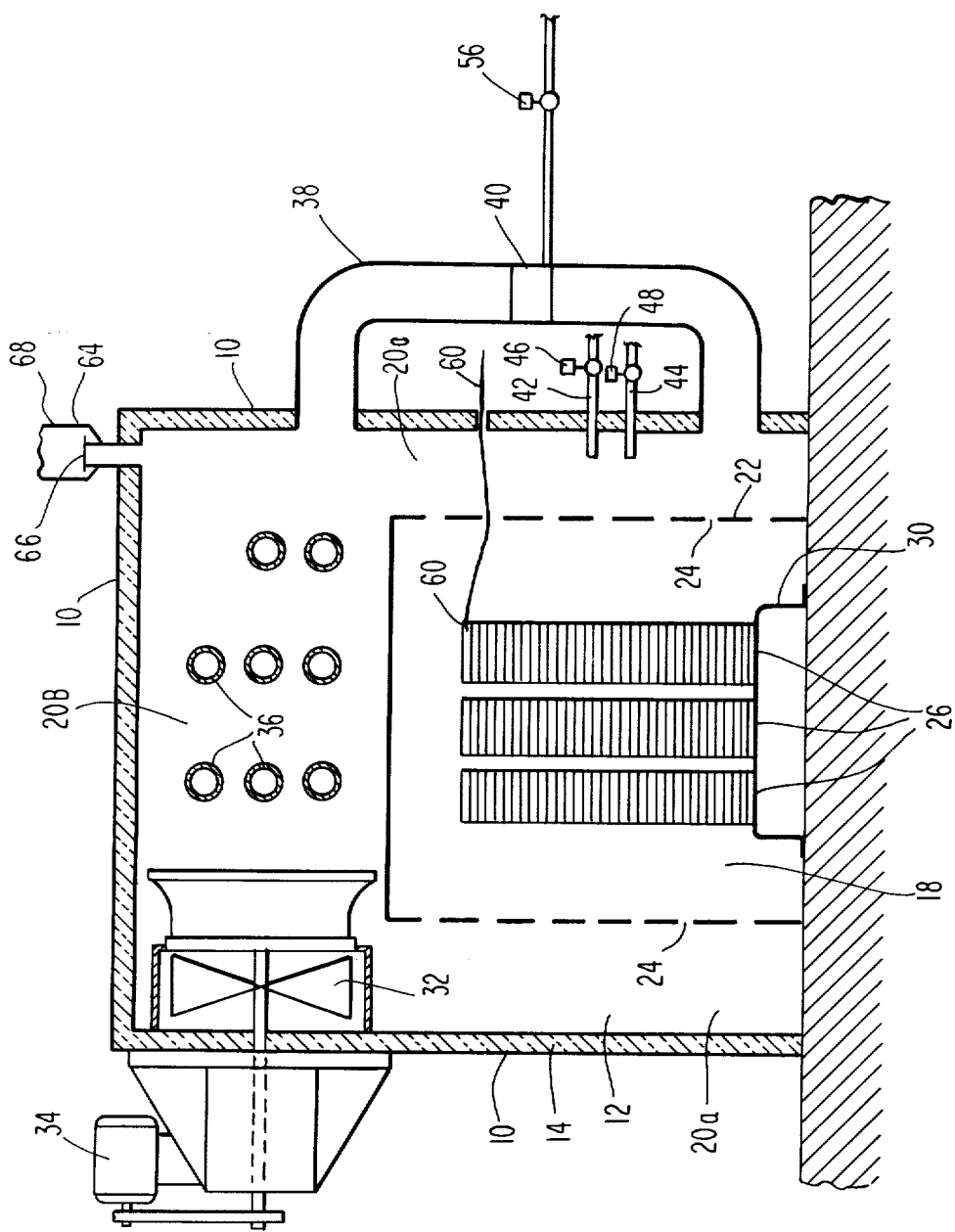
FIG. 3 represents a cross section of the oven of FIG. 2.

FIG. 2 depicts in perspective the oven of the present invention. FIG. 3 is a cross section along the line 3—3 of FIG. 2.

In FIGS. 2 and 3, outer casing 10 forms a gas tight chamber 12. The casing includes heat insulation 14 to prevent undue heat loss. Doors 16 are provided with gaskets so as to seal tightly to casing 10. Chamber 12 defined by the casing 10 is divided into two parts, a load area 18 and circulation passages 20a, 20b and 20c. The wall 22 separating the load area 18 from the circulation passages 20a, 20b, and 20c is provided with numerous louvres 24 arranged to make the flow of gas across the load area 18 as uniform as possible. A load of battery plates 26 is shown located in the load area 18 on pallet 30.

Fan 32 driven by motor 34 circulates the gaseous atmosphere in the oven via the circulation passages 20a, b, c, across the load area 18. A heating means comprising internally heated pipes 36 is arranged to heat the gas within the circulation passage 20b. An alternate gas passage 38 with a cooling coil 40 bypasses circulation passage 20c. When cooling water is admitted to the coil 40 the gasses flowing in the chamber are effectively cooled. The heating means 36 may be a steam coil an electrical heater coil or a gas burner 37 firing into a pipe coil with flue 39 as shown.

A steam inlet pipe 42 and a carbon dioxide inlet pipe 44 are provided for the introduction of steam and carbon dioxide respectively to the oven. Control valves 46 and 48 serve to control the flow of gasses to pipes 42 and 44 respectively.

A control panel 50 houses the control system for the oven. The control includes a program cam 52 and temperature controls 54 for the heating means 36. The program cam is operatively connected to the temperature control 54 etc., the gas valves 46 and 48 and to valve 56 controlling the flow of cooling water to the cooling coils 40. The particular program cam of the invention is cut to follow the program of steps 2 to 7 described above.

A thermocouple and leads 60 is shown set between the top plates of the right hand pile of plates of load 26. The leads of the thermocouple are led to control box 50 and recorder 62. This couple may be used to determine the point in time at which plates in its vicinity are dry.

As a safety measure and to prevent the build-up of excessive internal pressures such as from the introduction of steam or gas into the oven, a large relief valve is connected to the interior of the oven. Such a valve is shown at 64. As shown, it is a simple gravity actuated flap valve 66 within a flue pipe 68. By means of this valve, a positive pressure of a few inches of water may be maintained within the box. The positive pressure tends to prevent the inflow of air and the oxygen forming a part thereof.

Figure 4:
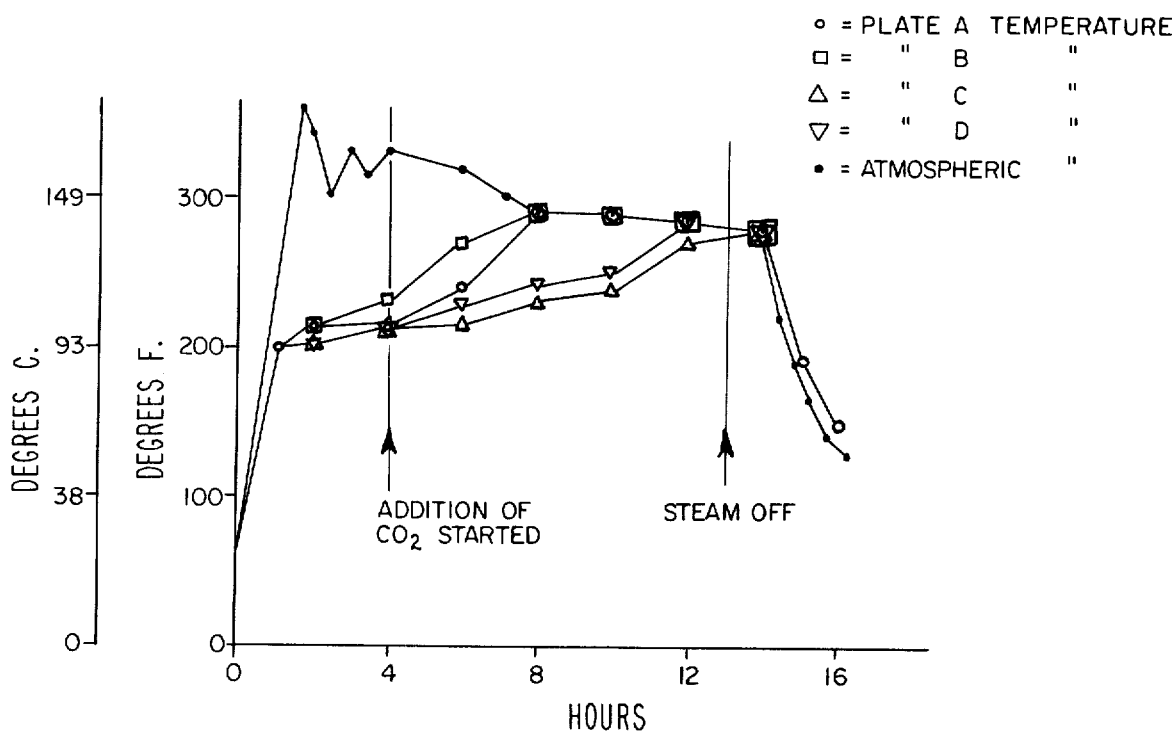
FIG. 4 represents the temperature condition during an actual drying cycle.

FIG. 4 represents the actual readings taken during a drying run in accordance with the second embodiment discussed above. The first high temperature was set at 350°F. (177°C.) and the second at 290°F. (143°C.). The load was 4 skid loads of plates weighing about 2 tons each. The lead oxide content of the plates was found to be as follows:

| Position | | | | |
|---|---|---|---|---|
| " | A | front, bottom, hot | 5.8% | PbO |
| " | B | back, bottom, hot | 6.9% | " |
| " | C | back, top, cold | 4.6% | " |
| " | D | front, top, cold | 6.0% | " |

In actual practice, it is difficult and costly to make a piece of process equipment, such as an oven, absolutely gas tight. The seams are not completely tight nor are the door seals.

In particular, a battery plate drier is exposed to dampness as well as to acidulated wash water which may in time result in corrosion and additional leakage. In any case, some oxygen inevitably enters the oven during a drying cycle. This probably reacts very rapidly with active lead sponge and causes an equivalent oxide pick-up in the load. This is the probable source of the oxidation found in normal plate runs.

Having fully described the process of our invention, having described an apparatus for carrying it out and having illustrated actual tests of the operation of the same, we now claim:

1. A method of drying wet formed negative storage battery plates without oxidation which comprises in sequence:
   a. placing the wet formed negative plates in piled configuration in an enclosed chamber with an atmosphere therein;
   b. sealing the chamber;
   c. introducing steam into the chamber;
   d. circulating the atmosphere in the chamber and adding heat and steam thereto at a chosen temperature profile to provide a drying cycle until the plates are dry;
   f. with circulation continuing, providing a cooling cycle by:
      1. introducing an inert gas other than steam into the chamber;
      2. stopping the introduction of steam while continuing the introduction of inert gas other than steam;
      3. stopping the introduction of heat; and,
      4. cooling the atmosphere in the oven until the temperature of the plates is taken below a chosen value.

2. A method as defined in claim 1 wherein the chosen temperature profile of the drying cycle includes an initial time period at 350°F. and a further time period at 290°F.

3. A method as defined in claim 1 wherein the chosen value below which the temperature of the plates is taken is 150°F.

4. A method as defined in claim 1 including a means for determining when the plates are dry; the means comprising a temperature sensor operatively attached to at least one of the negative plates.

5. A method as defined in claim 1 wherein a chosen time period elapses between stopping the introduction of steam and stopping the introduction of heat to the chamber.

6. A method as defined in claim 1 wherein the inert gas other than steam is selected from the group which consists of carbon dioxide and nitrogen.

* * * * *